United States Patent [19]

Merialdo

[11] Patent Number: 5,444,617

[45] Date of Patent: Aug. 22, 1995

[54] METHOD AND APPARATUS FOR ADAPTIVELY GENERATING FIELD OF APPLICATION DEPENDENT LANGUAGE MODELS FOR USE IN INTELLIGENT SYSTEMS

[75] Inventor: Bernard Merialdo, Valbonne, France

[73] Assignee: International Business Machines Corporation, Armonk, N.Y.

[21] Appl. No.: 166,777

[22] Filed: Dec. 14, 1993

[30] Foreign Application Priority Data

Dec. 17, 1992 [EP] European Pat. Off. ........... 92480198

[51] Int. Cl.⁶ .............................................. G06F 15/38
[52] U.S. Cl. .............................. 364/419.1; 364/419.08; 395/2.47
[58] Field of Search ................... 364/419.01, 419.02, 364/419.03, 419.08, 419.19, 419.10, 419.11; 395/2.44, 2.47, 2.49, 2.51, 2.54, 2.64, 2.66, 2.79, 2.86

[56] References Cited

U.S. PATENT DOCUMENTS

| | | |
|---|---|---|
| 4,942,526 | 7/1990 | Okajima et al. . |
| 5,005,203 | 4/1991 | Ney .................................... 395/2.64 |
| 5,195,167 | 3/1993 | Bahl et al. .......................... 395/2.51 |
| 5,267,165 | 11/1993 | Sirat . |

FOREIGN PATENT DOCUMENTS

| | | |
|---|---|---|
| 0238689 | 3/1986 | European Pat. Off. . |
| 0245595 | 2/1987 | European Pat. Off. . |
| 0300648 | 7/1988 | European Pat. Off. . |
| 0313975 | 10/1988 | European Pat. Off. . |
| 0387602 | 2/1990 | European Pat. Off. . |
| 0508519 | 3/1992 | European Pat. Off. . |

OTHER PUBLICATIONS

Speech Technology, vol. 5, No. 3, Feb. 1991, New York US pp. 96–100, Meisel et al "Efficient Representation of Speech for Recognition", p. 97, left col., paragrah 2—p. 99, left col., paragraph 1; figures 2, 3.

*Primary Examiner*—Robert A. Weinhardt
*Attorney, Agent, or Firm*—John J. Timar

[57] ABSTRACT

A system architecture for providing human intelligible information by processing a flow of input data; e.g., converting speech (source information) into printable data (target information) based on target-dependent probabilistic models; and for enabling efficient switching from one target field of information into another. To that end, the system is provided with a language modeling device including a data base loadable with an application-dependent corpus of words and/or symbols through a workstation; and a language modeling processor programmed to refresh, in practice, a tree-organized model, efficiently, with no blocking situations, and at a reasonable cost.

12 Claims, 6 Drawing Sheets

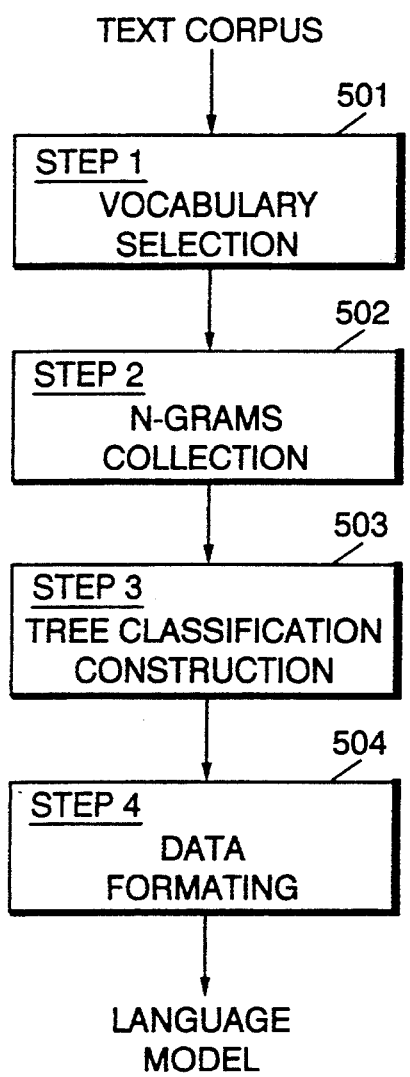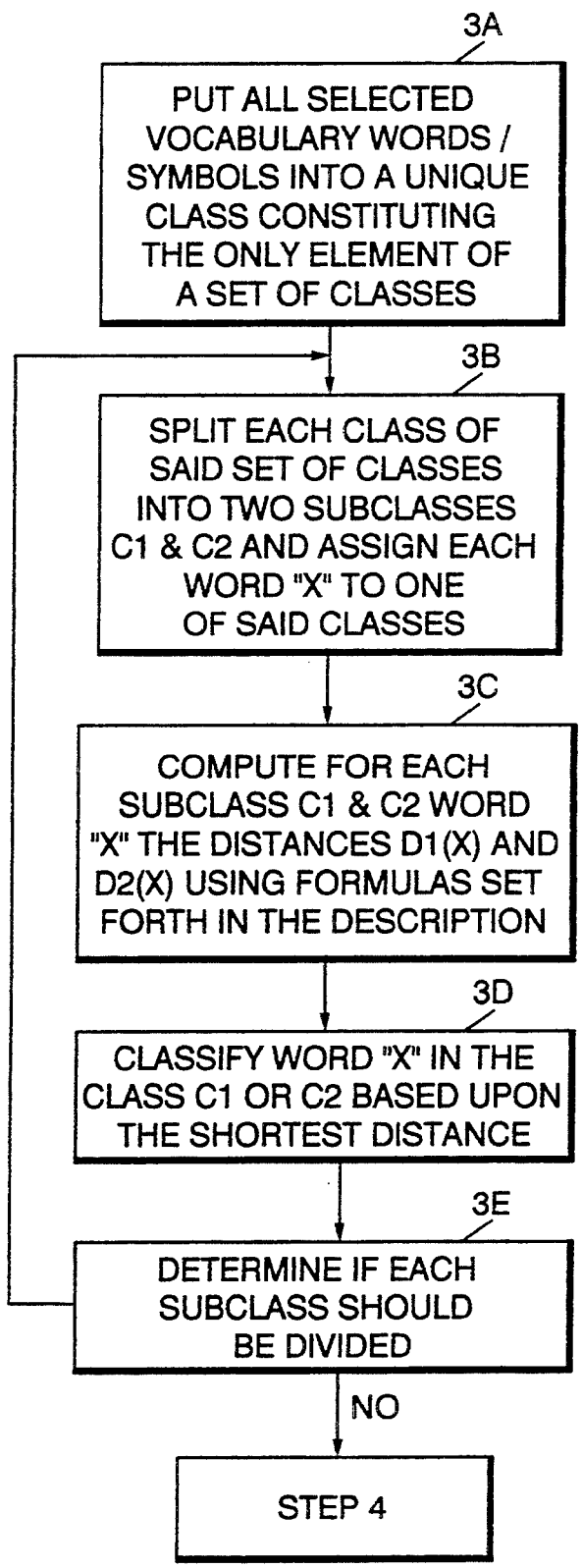

METHOD AND APPARATUS FOR ADAPTIVELY GENERATING FIELD OF APPLICATION DEPENDENT LANGUAGE MODELS FOR USE IN INTELLIGENT SYSTEMS

FIELD OF THE INVENTION

The present invention relates to intelligent machines, i.e., machines capable of providing humanly intelligible information by processing a flow of input data based on probabilistic models. It deals more particularly with a method for adaptively generating field dependent target models for such intelligent machines converting information from a source type of information into a target type of information.

BACKGROUND OF THE INVENTION

The processing power of modern computers has increased tremendously over the last thirty years. This has rendered implementable and commercially marketable systems for performing a number of applications which were, up to now, merely experimental in very large computers, but which were, nevertheless, unable to provide acceptable efficiency.

For instance, one may already know about machines made to translate text from one language (source) into text in another language (target). Such machines make foreign language speaking operators able to communicate with each other without having to go through the difficulty of studying foreign languages. Such a system has been described in European patent application 525470, "Method and System for Natural Language Translation", by Peter F. Brown et al published on Feb. 3, 1993. Another example deals with translating source information in a spoken form into target information in a printable or displayable or otherwise visually representable form.

The above are but few applications within a number of applications enabling not only easier communications between human beings, but also enabling man-to-machine communications, and vice-versa. For instance, a system for performing direct dictation and translating speech into text at affordable prices would be appreciated by a large public. The above applications involve automatic speech recognition and machine translation.

The initial approaches to both speech recognition and machine translation relied on "handwritten" rules. For instance, most speech recognition systems were built around a set of rules of syntax, semantics and acoustic phonetics. One had to discover a set of linguistic rules that can account for the vast complexity of language, and, then construct a coherent framework in which these rules could be assembled to recognize speech. This approach proved to contain insurmountable problems of writing down by hand a set of rules that covered the vast scope of natural language and constructing by hand the appropriate priorities, weighting factors and logical conditions, for performing the various selections leading to the target.

The approach fortunately switched to "statistical" techniques whereby rules are extracted automatically from large data bases of speech or text, and different types of linguistic operations are combined via probability theory. Basically, statistical approaches do exploit the fact that not all word sequences occur naturally with equal probability. Probabilistic models may then be constructed to be used later on, under normal operating conditions of the system.

These models have been shown to be useful for a number of different approaches such as those using language modeling to predict the next word from the previous ones, grammatical modeling to predict the next part of speech from previous parts, spell-to-sound rules to predict how a letter is pronounced depending on the context where it appears, allophone selection to predict how a phone is pronounced depending on the context where it appears, and morphological analysis to predict the part of speech from the spelling of the word, etc.

Obviously the problems, even if they now arise from a more rational consideration and therefore should lead to a more implementable system, are still complex. This should naturally impact on the final cost of the system.

In addition, one may easily understand from the above that the probabilistic approach to the problem is essentially context dependent. In other words, building a universal system is not feasible. A system made for business or commercial field of applications, for instance, would not be applicable to legal matters or to the medical field.

If one needs to switch from one field of application to another for any reason including the need to resell the system, or to expand the actual possibilities of the system involved, the operation for converting the system at reasonable cost would not be feasible unless the architecture of the system was made to accommodate the above requirements and goals.

OBJECTS OF THE INVENTION

One object of this invention is to provide a system architecture made to enable converting the target from one field of application to another field of application at fairly reasonable cost.

Another object of the invention is to provide a method for performing field of application conversion with no probabilistic blocking conditions.

Still another object of the invention is to provide such a method and system architecture based on various approaches to modeling.

These and other objects and advantages of the invention will be more readily ascertained from the following detailed description when read in conjunction with the accompanying drawings.

Naturally, even though applicable to a large domain of applications as mentioned above, the following description, for the sake of simplifying the explanations, shall be made with reference to a preferred embodiment in the speech recognition area of application wherein the pronounced word is predicted from previous ones. It should however be understood that this in no way implies a limitation of the present invention to that specific type of implementation involving the specific types of source and target information considered in the preferred embodiment.

BRIEF DESCRIPTION OF THE DRAWINGS

FIG. 5 is a block diagram representing the flow chart for implementing the invention.

FIG. 5A is a flow chart representation of the steps of tree classification construction in language modeling.

DETAILED DESCRIPTION OF A PREFERRED EMBODIMENT OF THE INVENTION

Figure 1:
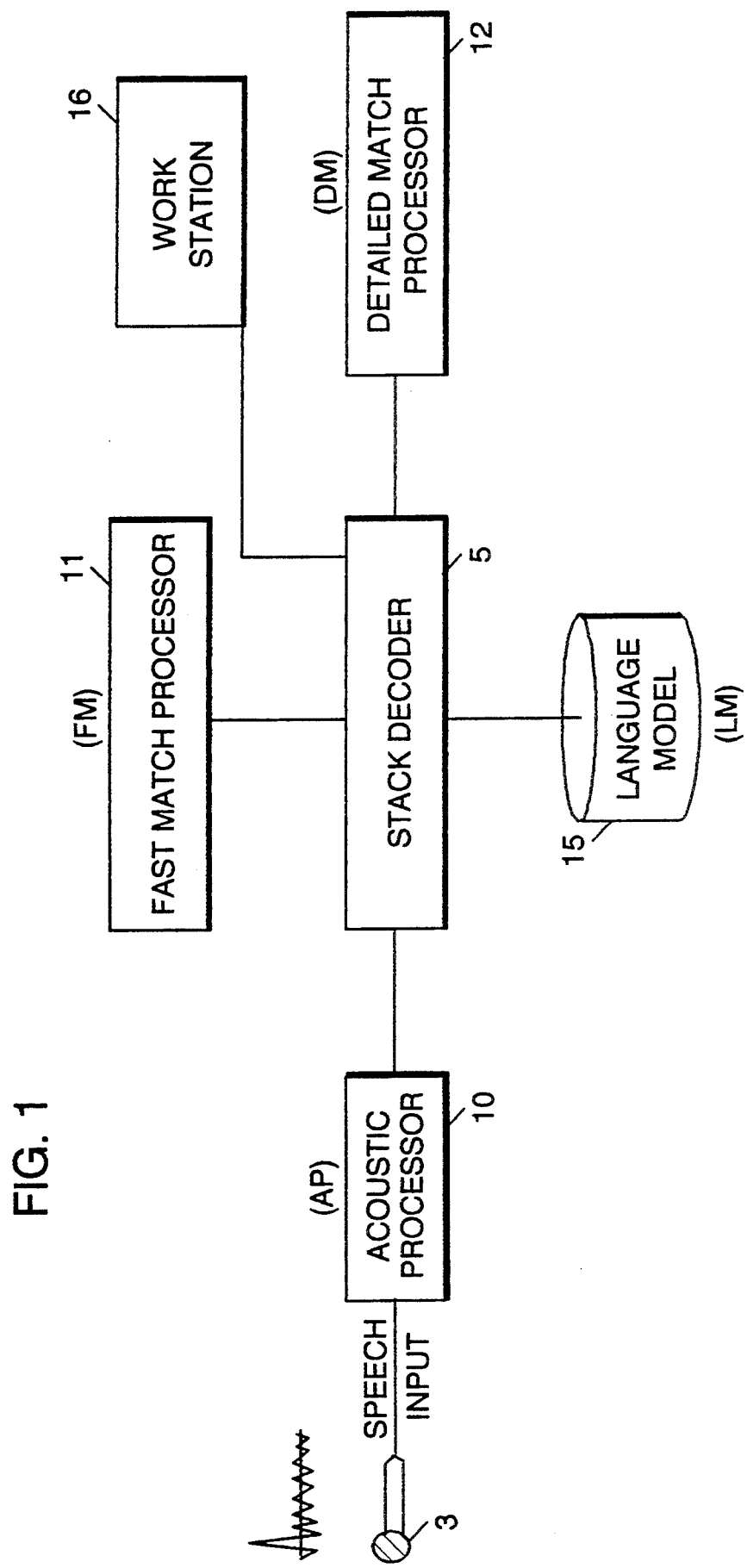
FIG. 1 is a block diagram of a speech recognition system wherein the invention may be implemented.

Represented in FIG. 1 is a block diagram of a speech recognition system. Such a system is described in U.S. Pat. No. 4,833,712 which issued May 23, 1989, and is incorporated herein by reference. The system includes a stack decoder 5 to which are connected an acoustic processor (AP) 10, a fast match processor (FM) 11, a detailed match processor (DM) 12, a language model processor (LM) 15 and a workstation 16. Obviously the workstation 16 would provide a two-way man-machine interface. Such a workstation shall be used for both providing data information during the preparation cycle used to settle the machine for further performing an application and also as the man-to-system interface during the cycle of operating the system for its final intended use.

The acoustic processor (AP) 10 is designed to transform a speech waveform input 1, fed through a microphone 3, into a string of labels 11, 12, 13, ..., or phonemes each of which identifies a corresponding sound type or class, e.g. li∈ {1, 2, 3, ... 200}. In this system the acoustic processor (AP) 10 is based on a unique model of the human ear and is described in detail in the European Patent Application 179280 published on April 30, 1986 and entitled "Non-Linear Signal Processing in a Speech Recognition System", and in summary form in U.S. Pat. No. 4,718,094 which issued on Jan. 5, 1988.

Figure 2:
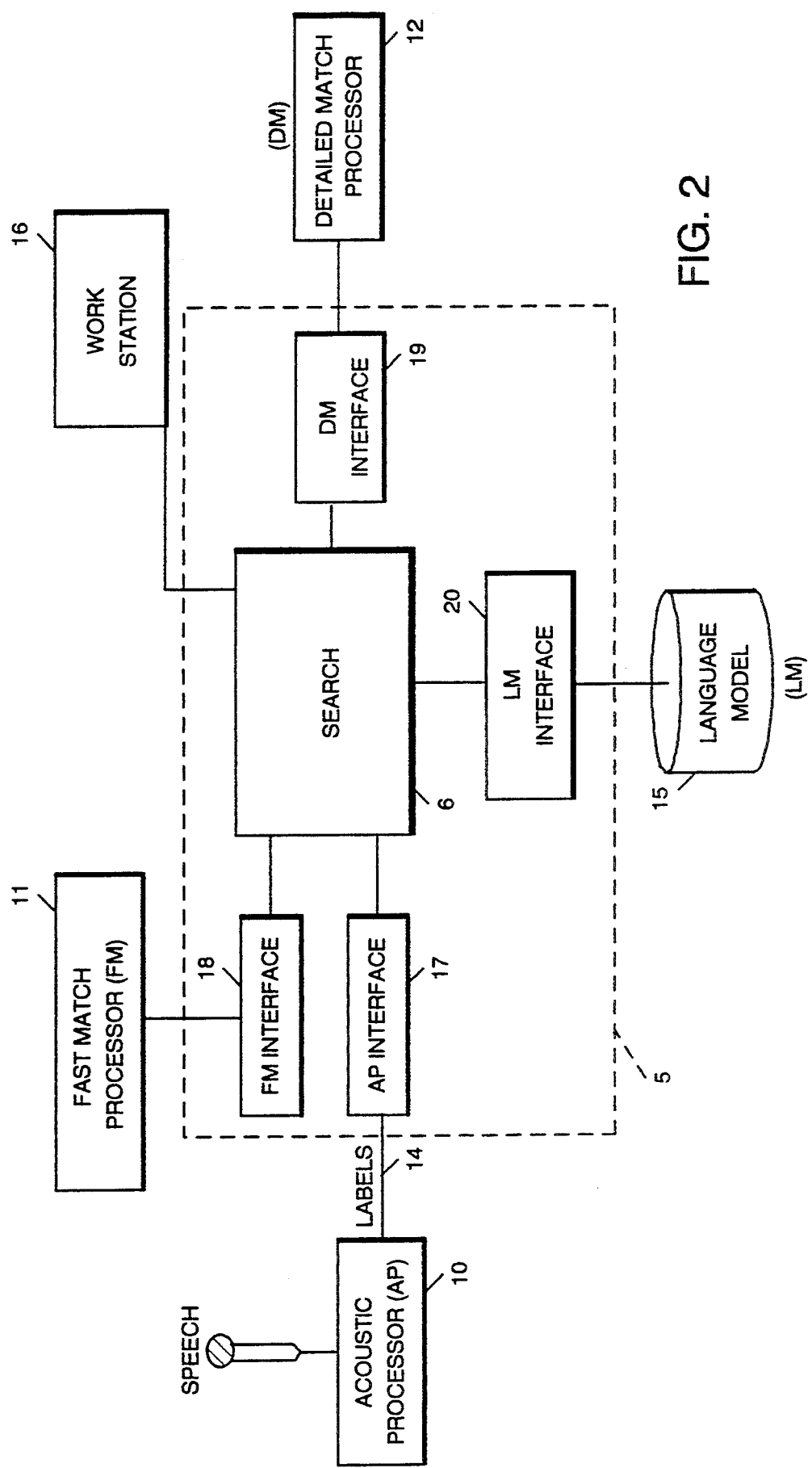
FIG. 2 is another representation of FIG. 1 showing a more detailed implementation of the stack decoder represented therein.

The labels 14 from the acoustic processor (AP) 10 enter the stack decoder 5. Functionally, the stack decoder 5 may be represented as shown in FIG. 2. The main stack decoder element is a search element 6 which communicates through interfaces 17, 18, 19, 20, with the acoustic processor (AP) 10, the fast match (FM) processor 11, the detailed match (DM) processor 12 and the language model (LM) processor 15, respectively.

In operation, labels from the acoustic processor (AP) 10 are directed by the search element 6 to the fast match (FM) processor 11. The fast match processor is described in detail in U.S. Pat. No. 4,718,094 entitled "Speech Recognition System" which is incorporated herein by reference. Briefly stated the object of fast matching is to determine the most likely word (or words) in a vocabulary of words for a given string of labels. For instance, determine a list of 200 candidate words for a portion of signal, by examining words in a vocabulary of words and reducing the number of candidate words for a given string of incoming labels. The fast match is based on probabilistic finite state machines, also referred to as Markov models.

Once the number of candidates has been reduced by using the fast match (FM) processor 11, the stack decoder (SD) 5 communicates with the language model (LM) 15 which determines the contextual likelihood of each candidate word in the fast match candidate list based on existing n-grams, sequences of "n" consecutive words. Language modeling is described below in detail.

As already mentioned, the invention also applies to other approaches to modeling, e.g., grammatical modeling, or modeling based on spell-to-sound rules, allophone selection, morphological analysis, etc . . . The following description will however refer to language modeling for the sake of simplifying the description of the preferred mode of implementation.

Preferably, the detailed match (DM) operation examines, then, those words from the fast match candidate list which have a reasonable likelihood of being the spoken word based on the language model structure. A detailed match (DM) operation is described in the above mentioned U.S. Pat. No. 4,718,094 for "Speech Recognition System."

After the detailed match is performed, the language model (LM) 15 is, preferably, again invoked to further determine word likelihood.

Figure 3:
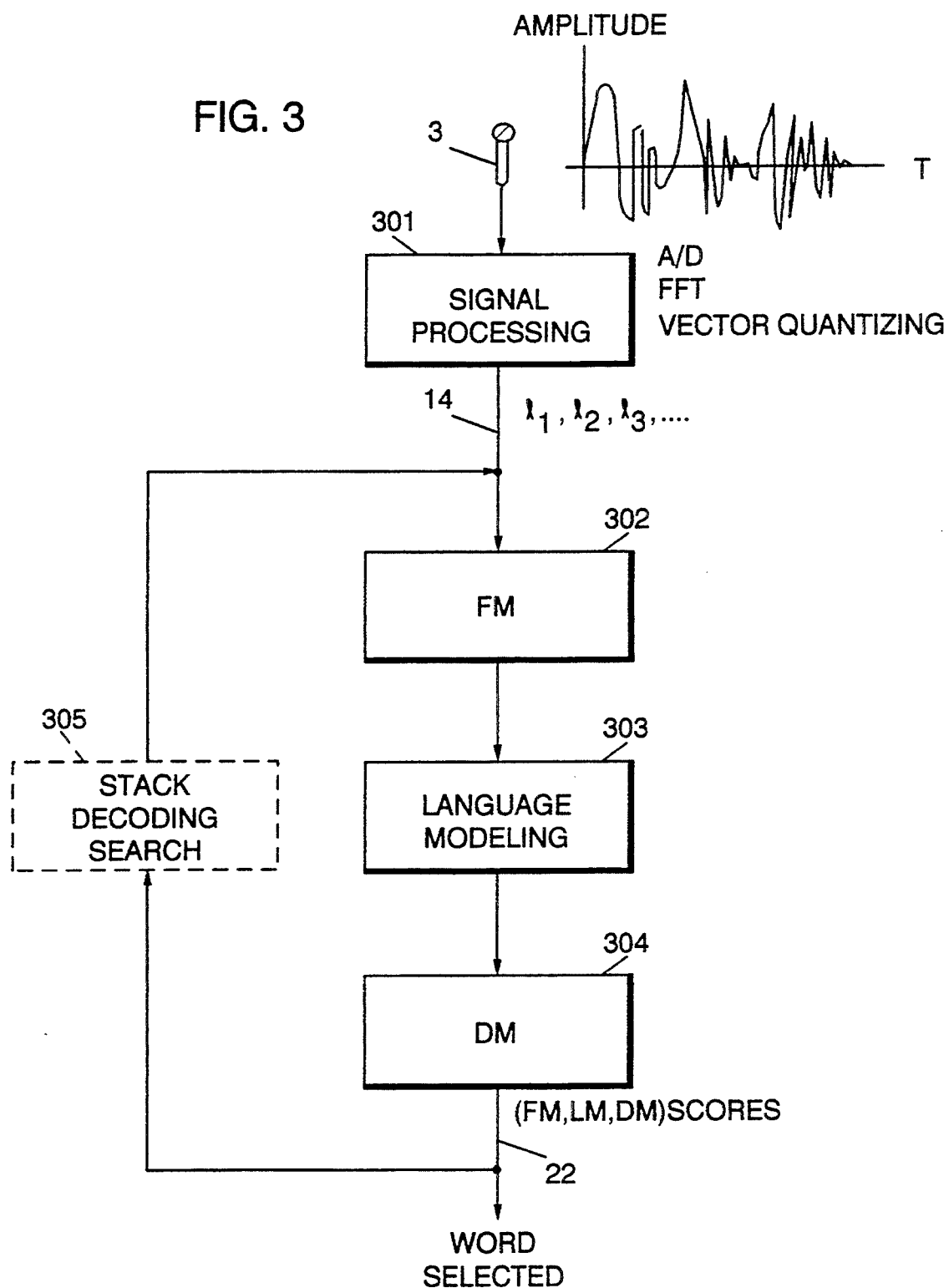
FIG. 3 is a block diagram showing a functional representation of speech recognition operations performed with the system of both FIGS. 1 and 2.

The above system operation may be summarized into a functional diagram as represented in FIG. 3. The voice signal amplitude versus time provided by a microphone 3 as represented in the upper part of FIG. 3, is first submitted to a signal processing operation 301. In fact one should say signal processing operations, since, as one could derive from the above cited references, this processing includes, for instance, conventional analog-to-digital conversion operations, fast Fourier transform (FFT) operations, acoustic modeling operations (such as ear modeling), and vector quantizing operations. This leads finally to providing a flow of labels 14, 11, 12, 13, etc. each label li belonging to a set of, for example, 200 labels, for each 1/100 second.

The next operation is the so-called fast match operation 302. This fast match operation 302 involves considering a vocabulary of, for example, 20,000 words within a file derived on the basis of both orthographic and phonetic considerations. The fast match operation 302 may also involve locutor voice modeling. A fast match operation provides a list of, for example, 200 candidate words per portion of considered voice signal. Those 200 candidate words are then submitted to a tree-structured language modeling operation 303 to derive therefrom acoustic and linguistic scores to be submitted to the next step, i.e., the detailed match operation step. The detailed match operation 304 is made to provide a detailed match acoustic score 22. The fast match, language modeling, and detailed match operations are to be combined together to finally lead to the selection of the right word matching with the portion of the considered speech signal provided by the microphone 3. In practice, and as one could easily understand, and/or derive from the prior art cited above, the process leading to the choice of the right words best matching the spoken words needs repetitive operation of those 3 steps, i.e., fast matching, language modeling and detailed matching through the stack decoding operation 305.

The language modeling operation 303 is the field dependent step of the process. This step involves a field dependent tree-structured reference base for the statistical approach to the problem, with reference to the application field dependent data base. Field dependent modeling enabling further decision making operations, when operating the system for its intended use, is a crucial item for the approach considered herein and even for any approach mentioned above, whether it is based on language modeling, grammatical modeling or otherwise. However, the following description refers to language modeling just for the sake of giving a clear description of the invention.

What makes the above described architecture particularly attractive, is that, assuming a data base is used to store textual information representative of a given target field of application, and assuming a powerful, and yet efficient method (i.e., with no aberration or blocking condition), is provided to convert the data base contents into a language model (decision tree) that could be used by the speech recognition system, then the system could be converted from one field of application (e.g. medical application) to another (e.g. commercial application). Obviously, this would affect, in a positive way, the commercial usefulness of the proposed system architecture, by making the language modeling operation 303 reasonably adaptable to various fields of applications, and therefore make the whole system affordable at fairly reasonable prices.

Figure 4:
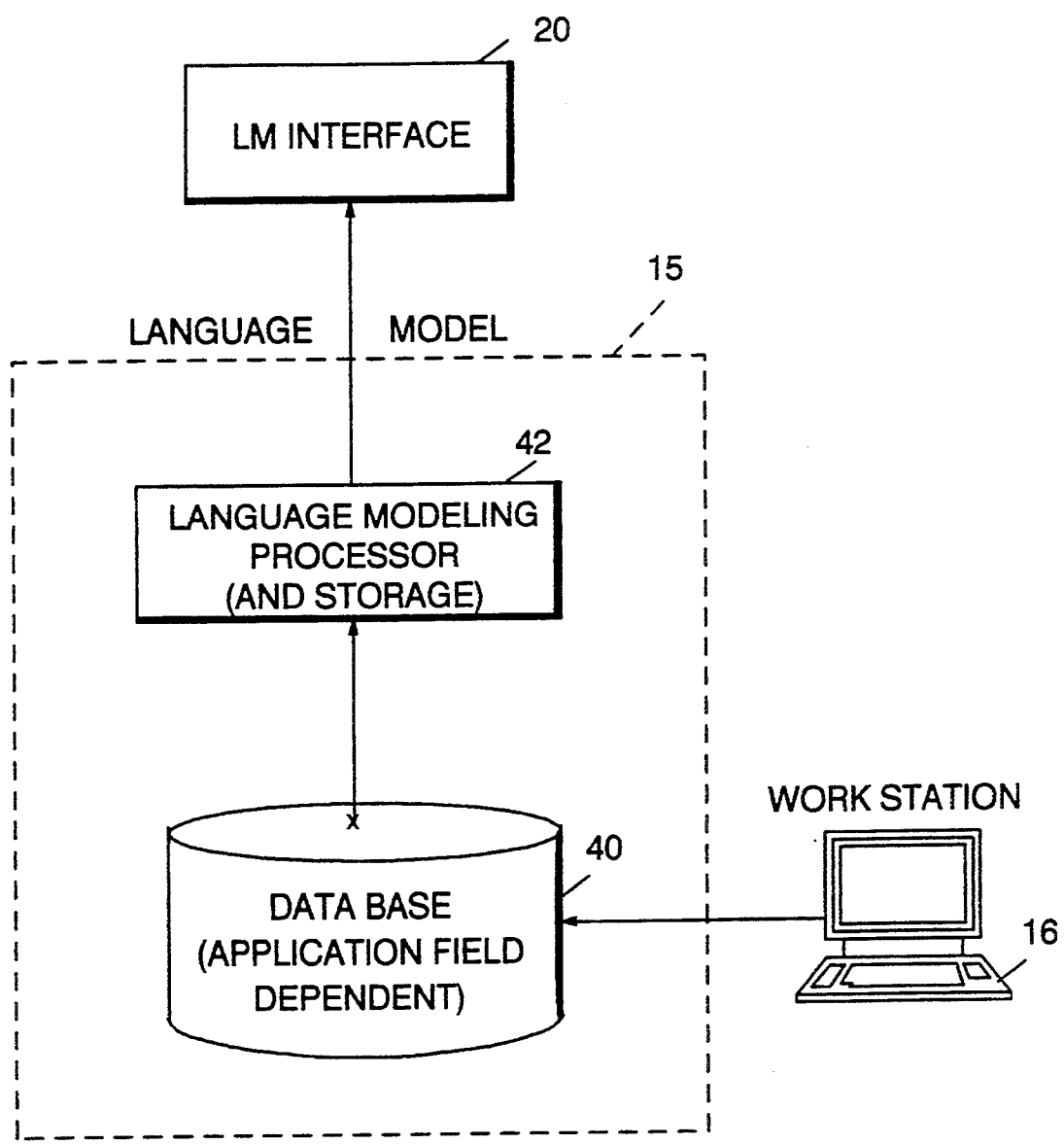
FIG. 4 is a block diagram of the device for implementing the invention within the system of FIGS. 1 and 2.

Represented in FIG. 4 is the language model (LM) device architecture proposed herein to achieve the adaptability provided by the invention.

The language model (LM) device 15 is now made to include a data base 40 for storing application dependent data, herein referred to as "text corpus". Attached to the data base 40 is a workstation 16 which enables entering, and/or amending, the data base contents as needed, to convert the system to a different client/application. Obviously one could also use the workstation 16 already attached to the system represented in FIG. 1. The application dependent data base 40 is also connected to a language modeling processor 42 made to process the text corpus and provide the language model 15 in a decision tree format for the system of FIGS. 1 and 2, capable of operating, for instance in the system described in the above mentioned U.S. Pat. No. 4,833,712. Both the text data base 40 and language modeling processor 42 are included in the language model device 15 of FIGS. 1 and 2. Such a language model device should then be connected to the language model (LM) interface 20. In summary, the language modeling processor 42 should provide a decision tree specific to the current target application field, as represented by the contents of application dependent data base 40 and store that decision tree into a language model storage 40 or into the language model (LM) interface 20. The power and full efficiency of the method used to generate and store a language model is a key factor in enabling full achievement of one of the objects of this invention, that is, flexibility of the system to convert from one target field of application to another one at fairly reasonable cost.

Represented in FIG. 5 is a general flow-chart for performing the language modeling operations. The proposed corpus of text read from the application field dependent data base 40 is processed in a first step 5.01 (vocabulary selection), starting with selecting a vocabulary listing the most frequent target words. This list of most frequent words is then optionally submitted to both the technician in charge of personalizing the system to the application looked for, and/or the client for whom the system is being prepared, through the attached workstation 16 (see FIGS. 1 and 4). The technician and/or the client may suggest vocabulary amendments through additional insertions or deletions. For instance, the technician may deem it useful to add numbers, punctuation, measuring units, etc., while the client may want to amend word spelling, or add or delete words, etc. These facilities are, as already mentioned, additional optional facilities which could easily be provided given the proposed system architecture and method for personalizing the system, and at no extra cost. The overall operation (step 1) shall be referred to herein as vocabulary selection. In a preferred embodiment of this invention the vocabulary selection has been implemented to provide a list of, for example, 20 to 25,000 words.

The next step 502 (step 2) involves collecting n-grams from the selected vocabulary. This operation is essentially performed to define and store into the language modeling facility, the frequency of occurrence of the different n-grams; that is, the frequency of occurrence of given sequences of n consecutive words in the vocabulary list of 25,000 words. For instance, in a preferred embodiment, n might be selected to be equal to 3 or 5 or 10. This second step shall be referred to as n-grams collection.

The language modeling process switches then to block 503 (step 3) wherein the tree classification is constructed. Therefore the third step shall be referred to as tree classification construction. A theorem has been suggested by P. A. Chou in "Application of Information Theory to Pattern Recognition and the Design of Decision Trees and Trellises", PhD Thesis, Stanford University, June 1988. Unfortunately this theorem might lead to blocking situations under normal operating conditions, which, from a practical standpoint, is a main drawback.

Finally, to make the system of the invention and the method fully implementable in the speech recognition system referred to in the above-mentioned prior art, a fourth step 504 referred to as a data formatting step can be used. Obviously, this data formatting step is not fundamental to the invention. It will, however, be described below, as well as the three previous steps, for sake of completeness of the description of the best embodiment of this invention.

The above four step process shall now be described in detail and illustrated with a few examples to help in understanding the invention.

The best mode of implementing the method of the invention involves transforming a text corpus which is typical of a user's field of application (for example, radiology reports, business correspondence, etc.) into a language model which can be used by the speech recognition system, and more particularly by the IBM speech recognition system as disclosed in the above cited references.

Starting from the text corpus, this transformation is performed using the four step process.

The text corpus is generally composed of a set of files where the text appears in character form. These files are concatenated (at least conceptually) so that the text corpus can be seen as a long sequence of words $$w1, w2, w3 \ldots, w_T$$

Punctuation symbols are also generally considered as words. The order in which the files are concatenated is not important, because it is observed experimentally that, when the files are ordered differently, the quality of the resulting language model remains practically the same. For sake of illustration, the following is a trivial example of a text corpus containing 2 files:

--- file 1 : "La cigale et la fourmi."
file 2 : La cigale, ayant chante tout l'ete.
This corpus is viewed as a sequence of 17 words :
"   La   cigale   et   la   fourmi   .   "

| w1 | w2 | w3 | w4 | w5 | w6 | w7 | w8 |
|---|---|---|---|---|---|---|---|
| La | | | | | | | |
| w9 | | | | | | | |
| cigale | , | ayant | chante | tout | l' | | |
| w10 | w11 | w12 | w13 | w14 | w15 | | |
| ete | . | | | | | | |
| w16 | w17 | | | | | | |

As already mentioned, this is but a trivial example just to illustrate the process. In practice, a text corpus is very large, containing, for instance, several million words. Also different words could be added to the corpus such as for editing purposes. For instance, ill is possible to add a special word, the "sentence mark" at the end of each sentence. Needless to say, the corpus of text may be entered into the application dependent data base 40 through the workstation 16 attached to the language model processor 15, as represented in FIG. 4. The steps represented in FIG. 5 to implement the language modeling operation 303 of FIG. 3 will now be described in detail.

Step 1: Vocabulary Selection

The corpus of text w1, w2, w3 ... wT, is first processed to derive a list of different words, together with their frequencies, that is, the number of times they appear in the text corpus.

The vocabulary is then formed by selecting the most frequent words (in the above mentioned IBM speech recognition system, a range of 20–30,000 words is allowed).

As already mentioned, and depending on the quality that is desired and the amount of effort that can be afforded, the list of most frequent words can be modified by one or several operations such as the following:

(a) add "mandatory words", for example, certain punctuation symbols (which we want in the vocabulary even if they do not occur very frequently in the corpus), digits and certain numbers, first names, geographical names, etc.;

(b) edit the list by potential users, for example, to correct spellings, or to remove multiple spellings of the same word (such as electrocardiogram and electro-cardiogram);

(c) add the plural form of a word whose singular form is on the list. This is useful when the text corpus is in French where these forms are generally homophones. This makes the vocabulary appear to be more consistent. Other inflections, such as verbs, can be added as well;

(d) add words required by the user, for example, user names, units, specialized technical terms, etc.

Step 2—Collection of n-gram frequencies:

In practice, the character string representation of the corpus of text $w_1 \ldots w_T$ is replaced by a representation wherein each word is replaced by its position number in the vocabulary. The vocabulary contains a special word called "unknown word" and the words of the corpus which do not appear in the vocabulary are replaced by the position number of "unknown word".

In the IBM speech recognition system, the unknown word is generally assigned position 0 and spelling <??>.

Example: let the vocabulary contain 4 words

| Position | Spelling |
|---|---|
| 0 | <??> |
| 1 | la |
| 2 | cigale |
| 3 | . |

The previous corpus will be represented as the list of 17 numbers: 0 1 2 0 1 0 3 0 1 2 0 0 0 0 0 0 3

When stored on a computer, this representation by numbers can be compressed further to save storage using conventional means.

Let the vocabulary contain V words (generally $V \approx 20,000$) with position numbers ranging from 0 to V-1. We now want to know the frequency of occurrence of a given sequence of words $x_1 \ldots x_n$ (called n-gram) in the corpus. There are $V^n$ possible sequences. Generally, only a small fraction of these do actually occur.

Frequencies can be computed in the following way: use a counter $c(x_1 \ldots x_n)$ for each possible n-gram, a counter whose initial value is 0. Consider a window of n consecutive words in the corpus with a window initially located at the beginning of the corpus. Increment the counter of the n-gram that is visible in the window by one, then shift the window by one position. Repeat this until the window has reached the end of the corpus.

Note that for consistency, the window is initially located so that its rightmost element is the first word of the corpus. Positions in the corpus before the first word are considered to be either a "sentence mark", or some punctuation symbol (such as a period).

Example: collect 2-grams

The corpus of the above cited example is:

```
        0  1  2  0  1 ... 3
window  3  0                    c(3,0) ← c(3,0) + 1
           0  1                 c(0,1) ← c(0,1) + 1
              1  2              c(1,2) ← c(1,2) + 1
              etc.
```

In this case, there are 16 counters $c(0,0) \ldots c(3,3)$, which are initially set to zero.

In this example, the result is the table of 2-gram frequencies (counters)

| c | 0 | 1 | 2 | 3 |
|---|---|---|---|---|
| 0 | 5 | 3 | 0 | 2 |
| 1 | 1 | 0 | 2 | 0 |
| 2 | 2 | 0 | 0 | 0 |
| 3 | 2 | 0 | 0 | 0 |

This table can generally be compressed by coding only non-zero values.

Figure 6:
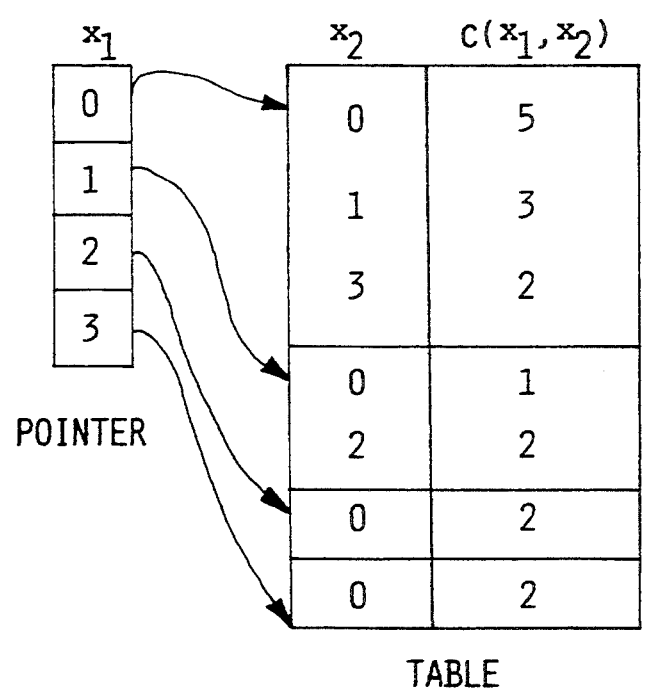
FIG. 6 is a schematic representation of one element of the invention.

| $x_1$ | $x_2$ | $c(x_1, x_2)$ |
|---|---|---|
| 0 | 0 | 5 |
| 0 | 1 | 3 |
| 0 | 3 | 2 |
| 1 | 0 | 1 |
| 1 | 2 | 2 |
| 2 | 0 | 2 |
| 3 | 0 | 2 | which saves storage. Then, further compression is achievable using, for instance, indirect addressing wherein $x_1$ is used as a pointer as shown in FIG. 6. This might look trivial for the above example, but one should remember that in practice, for instance with the IBM speech recognition system cited in the prior art references, with $V=20,000$, then $V^n$ is such a large number that it is impossible to have enough memory to store all possible counters. Since only a small number of n-grams do occur, most counters always have a value of 0 (if the corpus contains one million words, there cannot be more than one million different n-grams). It is therefore interesting to use indexed data structures so that only non-zero counters are physically allocated storage, and then use conventional indirect addressing techniques to further save memory and operating cycles.

Step 3—Construction of tree-based classification

In language modeling techniques one tries to predict the value of $x_n$ from the values of $x_1 \ldots x_{n-1}$. In the n-gram $(x_1 \ldots x_n)$, the part $(x_1 \ldots x_{n-1})$ is called the context, and $x_n$ is the element to be predicted. A context has $n-1$ positions, from position 1 to position $n-1$.

In tree-based classification, contexts $(x_1 \ldots x_{n-1})$ which are followed by similar values of $x_n$ are kept together. The steps involved in tree classification construction are shown in FIG. 5A.

Initially, all contexts are put in a single class as depicted in step 3A. This class is partitioned into 2 subclasses, then iteratively each of these subclasses is also partitioned so that the classification gets more and more precise (steps 3B to 3E).

Several stopping criteria can be used to decide when to stop partitioning. In practice, this tree-based classification can be performed using the frequencies $c(x_1 x_2 \ldots x_n)$ which have been computed already. We also use an array class $(x_1 \ldots x_{n-1})$ which indicates the class number of each context. This array is updated during the construction. We use a variable nclass which indicates the number of classes built so far.

Based on the above, any programmer, given the following instructions, may then build easily the programs for implementing the tree-based classification construction.

Step 3A: Initialization (there is only one class including all the words)

---
. nclass ← 1
. For all $(x_1 \ldots x_{n-1})$ from $(0 \ldots 0)$ to $(V\text{-}1, \ldots V\text{-}1)$
        class $(x_1 \ldots x_{n-1})$ ← nclass
Steps 3B to 3E: Iteration (tree construction)
. For iclass = 1 by 1, while (iclass ≦ nclass)
    . Decide if class iclass should be split, if not iterate
    . Find the position jmax (among 1, 2, ... n−1) which produces the best split, with improvement $\delta_{max}$
    . If $\delta_{max}$ is smaller than a threshold, don't split and iterate
    . Else split iclass
        . For all $(x_1 \ldots x_{n-1})$ do
            . If class $(x_1 \ldots x_{n-1})$ = iclass then
                . If $x_{jmax}$ is in the first part of the split
                    Then class $(x_1 \ldots x_{n-1})$ = nclass + 1
                    Else class $(x_1 \ldots x_{n-1})$ = nclass + 2
                (2 new classes have been created)
        . nclass ← nclass + 2
    . iterate
---

The detailed description of each step in the iteration process is as follows:

(1) decide if class "iclass" should be split (step 3E)

As already mentioned, several criteria can be used; such as:

(a) The size of the class has to be larger than a threshold to avoid splitting classes which are already small enough. The size can be computed by ---
. Size ← 0
. For all $(x_1 \ldots x_{n-1} x_n)$
    If class $(x_1 \ldots x_{n-1})$ = iclass
        Then size ← size + C $(x_1 \ldots x_n)$
---

(b) The total number of classes created generally has to be smaller than a maximum because of storage limitations, The value of the threshold is found experimentally, depending on the nature of the data and the computation and storage resources that are devoted to the construction.

(2) Find the position jmax which produces the best split

This corresponds to the search for the maximum in a linear array:

---
. $\delta_{max} \leftarrow -\infty$  $j_{max} \leftarrow 1$
. For j = 1 to n−1
    . Find the best split according to position j
        Let $\delta$ be the improvement.
    . If $\delta_{max} \leq \delta$ then jmax ← j
                           and $\delta_{max} \leftarrow \delta$
---

(3) Find the best split according to position j Depending on the value of $x_j$, we will say that context $(x_1 \ldots x_{n-1})$ is in the first or second part of the split. Therefore, we use an array of V elements (part (0) part (1) ... part (V-1)), each element having value 1 or 2. The best split is constructed iteratively:

---
initialization
    . For x = 0 to V−1   part (x) = 1 or 2   (random assignment)
iteration
    . Do until part is not modified in the loop
        . For x = 0 to V−1 do  compute $d_1(x)$ and $d_2(x)$
        . For x = 0 to V−1 do
            If $d_1(x) > d_2(x)$ Then part (x) ← 2
                               Else part (x) ← 1
Computation of $d_1(x)$ (Step 3C)
---

Mathematically:

$$d_1(x) = - \sum_{y=0}^{V-1} p(x,y) \Phi[p_1(y)]$$

with the following definitions:

$$p(x,y) = \frac{\Sigma c(x_1 \ldots x_{n-1} y)}{N_{Total}}$$

where the summation is taken over all contexts $(x_1 \ldots x_{n-1})$ such that $x_j = x$, and $N_{Total}$ is the size of the class to be partitioned; and $$p_1(y) = p(y/C_1) = \frac{\Sigma c(x_1 \ldots x_{n-1} y)}{\Sigma c(x_1 \ldots x_{n-1} z)}$$

In the numerator, the summation is taken over all contexts $(x_1 \ldots x_{n-1})$, where $x_j$ belongs to $C_1$; in the demoninator, the summation is taken over all contexts where $x_3$ belongs to $C_1$ and over all possible values of z from 0 to V-1.

The variable $d_1(x)$ can be computed with the sequence of instructions:

```
. N ← 0  N₁ ← 0  p (*) <- 0  p₁(*) <- 0
. For all (x₁ ... xₙ₋₁ y) do
  . If class (x₁ ... xₙ₋₁) ≠ iclass then iterate
    . N ← N + C (x₁ ... xₙ₋₁ y)
    . If xⱼ = x then p (y) ← p(y) + C(x₁ ... xₙ₋₁ y)
    . If part (xⱼ) = 1 then
      . N₁ ← N₁ + C(x₁ ... xₙ y)
      . p₁(y) ← p₁(y) + C(x₁ ... xₙ₋₁ y)
. For y = 0 to V - 1 do
  . p (y) ← p(y) / N
  . p₁(y) ← p (y) / N₁
. d₁ (x) = 0
. For y = 0 to V-1 do
```

Description of $\Phi$ [p]

The function $\Phi$ is selected so that it does not lead to any blocking condition under normal operating conditions leading to probabilities equal to zero, in which case the $\text{Log}_2$ function would become infinite.

This function is defined by:

$$\Phi[p] = \text{Log}_2\, p, \text{ if } p > \epsilon$$

or $$\Phi[p] = (p/\epsilon) - 1 + \text{Log}_2(\epsilon), \text{ if } p < \epsilon.$$

This particularly efficient selection shows mathematically that the choice
$\epsilon = [\min\, p(x,y)]^2$
where the minimum is taken over all non-zero value of $p(x,y)$, is valid. In that case,
$\Phi [0] = 2\, \text{Log}\, [\min\, p(x,y)] - 1$
Computation of $d_2(x)$
Mathematically:

$$d_2(x) = -\sum_{y=0}^{V-1} p(x,y)\Phi[p_2(y)]$$

with the following definitions:

$$p(x,y) = \frac{\Sigma\, c(x_1 \ldots x_{n-1} y)}{N_{Total}},$$

where $p(x,y)$ has the same definition as indicated in the description of $d_1(x)$; and $$p_2(y) = p(y/C_2) = \frac{\Sigma\, c(x_1 \ldots x_{n-1} y)}{\Sigma\, c(x_1 \ldots x_{n-1} z)}$$

In the numerator, the summation is taken over all contexts $(x_1 \ldots x_{n-1})$ where $x_j$ belongs to in the denominator, the summation is taken over all contexts $(x_1 \ldots x_{n-1})$ where $x_j$ belongs to $C_2$ and over all possible values of z from 0 to V−1.

The variable $d_2(x)$ can be computed with the sequence of instructions:

```
. N ← 0  N₂ ← 0  p (*) ← 0  p₂(*) ← 0
. For all (x₁ ... xₙ₋₁ y) do
  . If class (x₁ ... xₙ₋₁) ≠ iclass then iterate
    . N ← n + c (x₁ ... xₙ₋₁ y)
    . If xⱼ = x then p(y) ← p(y) + c(x₁ ... xₙ₋₁ y)
    . If part (xⱼ) = 2 then
      . N₂ ← N₂ + c(x₁ ... xₙ y)
      . p₂(y) ← p₂(y) + C(x₁ ... xₙ₋₁ y)
. For y = 0 to V - 1 do
  . p (y) ← p(y) / N
  . p₂(y) ← p (y) / N₂
```

```
. d₂(x) = 0
. For y = 0 to V-1 do
    d₂(x) ← d₂(x) − p(y) Φ [p₂(y)]
```

Computation of the improvement $\delta$

For a given split (i.e., a given set of values for the array part) compute:

$$\delta(\text{part}) = \sum_{x=0}^{V-1} \left[ d_{\text{part}(x)}(x) + \sum_{y=0}^{V-1} p(x,y)\, \text{Log}\, p(y/x) \right]$$

The improvement $\delta$ is the value of $\delta$ (part) for the final value of the array part at the end of the iterations.

To help fully understand some essential step of the language modeling operation, let's take an example. This example shall, naturally be limited to a very small corpus (i.e., a 3 word vocabulary). Although the example is a simple one, it is fully explanatory of the present method.

Let's assume a 3 word vocabulary {a, b, c} and let the table of 2-gram frequencies be:

| C(x,y) | a | b | c |
|---|---|---|---|
| a | 30 | 30 | 1 |
| b | 1 | 1 | 30 |
| c | 0 | 2 | 5 |

Now, instead of starting the tree classification construction from scratch, let's assume we started with a random two subclasses ($C_1$ and $C_2$) and let's assume words a and b are both set to be initially in class $C_1$ while word c is assigned to class $C_2$. In other words:
$C_1 = \{a, b\}$  $C_2 = \{c\}$.

Let's now compute the distances of each corpus word relative to the subclasses:

For word a, the system computes:

$$d_1(a) = -p(a,a)\Phi[p(a/C_1)] - p(a,b)\Phi[p(b/C_1)] \\ -p(a,c)\Phi[p(c/C_1)]$$

The size of $C_1$ is:
$N_{c1} = 30+30+1+1+1+30 = 93$
The size of $C_2$ is:
$N_{c2} = 0+2+5 = 7$
The total count is: $93+7=100$ $$p(a,a) = \frac{30}{100} = 0.3;$$

$$p(a,b) = \frac{30}{100} = 0.3;$$

$$p(a,c) = \frac{1}{100} = 0.01$$

$$p(a/C_1) = \frac{30+1}{93} = .333;$$

$p(b/C_1) = 0.333;$ $p(c/C_1) = 0.333.$

The test performed on $p(a/C_1)$, $p(b/C_1)$ and $p(c/C_1)$ shows that none of these is equal to zero, therefore the function $\Phi$ is selected to be of the $\text{Log}_2$ form $$d_1(a) = -0.3\Phi[0.333] - 0.3\Phi[0.333] - 0.01\Phi[0.333]$$
$$= +0.3 \times 0.6883 + 0.3 \times 0.6883 + 0.01 \times 0.6883$$
$$= 0.4199$$

Similarly, $d_2(a)$ shall be given by:

$$d_2(a) = -p(a,a)\Phi[p(a/C_2)] - p(a,b)\Phi[p(b/C_2)]$$
$$-p(a,c)\Phi[p(b/C_2)]$$
$$p(a/C_2) = 0; p(b/C_2) = 2/7 \text{ and } p(c/C_2) = 5/7.$$

Here the computation of $\Phi$ for $p(a/C_2)$ switches to:

$$2 \log_2 [\min_{(a,a)} p(a,a)] - 1 = 2 \log \frac{1}{N} - 1 = -14.288$$

$$\Phi[p(b/C_2)] = -0.785 \text{ and } \Phi[p(c/C_2)] = -0.211;$$

$$d_2(a) = 0.3 \times 14.288 + 0.3 \times 0.785 + 0.01 \times 0.211 = 4.524$$

As indicated by Step 3D of FIG. 5A, since $d_1(a) < d_2(a)$, word a remains in subclass $C_1$.
A similar approach would lead to:
$d_1(b) = 0.220$ and $d_2(b) = 0.214$; consequently word b would switch to subclass $C_2$.
$d_1(c) = 0.048 > d_2(c) = 0.026$ and c remains in subclass $C_2$.
The tree would then be:

| The tree would then be: | C {a,b,c} |
|---|---|
| | $C_1$\{a\}  $C_2$\{b,c\} |

(4) Structuring of the data into a format which is usable in the IBM system of the above cited references:

To use a language model, we need to be able to compute the probability $p(y/x_1 \ldots x_{n-1})$ from the n-gram frequencies and the tree-based classification, wherein y is the unknown incoming word preceded by $x_1 \ldots x_{n-1}$. During the construction process, we keep the following values for each class iclass; i.e., values or parameters useless to the tree construction but needed when operating the speech recognition system for its intended use.

| . Position (iclass) | the jmax position value which gives the best split for iclass; if iclass is not split, then code position (iclass) = 0 (i.e., iclass is a leaf of the tree); |
|---|---|
| . Part (iclass, x) | the array part corresponding to the best split for the class iclass; each value is either 1 or 2; |
| . Son$_1$ (iclass) (Son$_2$ (iclass)) | the numbers of the subclasses obtained by splitting iclass (these are the values of (nclass + 1) and nclass + 2) at the time of iteration for iclass, as developed above); |
| .p(iclass, y) | the probability of y (0 to V-1) given the class iclass (it is computed even if the class is not split). |

These parameters are therefore stored during the tree construction, to be used when moving through the tree to identify y based on the context.

This last probability can be computed with the sequence (during the iteration for iclass):

```
. N ← 0
. p(iclass,*) ← 0
. For all (x_1 ... x_{n-1} y) do
   . If class (x_1 ... x_{n-1}) = iclass then
      . N ← N + c(x_1 ... x_{n-1} y)
      . p(iclass, y) ← p(iclass y) + c(x_1 ... x_{n-1} y)
. For y = 0 to V-1 do
   . p(iclass, y) ← p(iclass, y) / N
```

Description Of (LM) processor

This is the part of the mentioned IBM speech recognition system that will use the previous data $x_1 \ldots x_{n-1}$ score y by providing the probability $p(y/x_1 \ldots x_{n-1})$ to the stack decoder (SD).

In operation, the (LM) processor will perform the following steps:

```
. k ← 1  iclass ← 1 (variables)
. do (travel through the tree-structure)
   . q(k) ← p(iclass, y)
   . If position (iclass) = 0 then
   . If part (iclass, x_{position} (iclass) ) = 1
      The iclass = son_1 (iclass)
      Else iclass = son_2 (iclass)
   . k ← k+1
   . iterate through the do loop
```

At the end of the loop, we have the values of k, q(1), q(2), ... q(k) and iclass. The probability itself is then computed by:
. a←0
. For i=1 to k
a←a+lambda (i) x q(i)
. $p(y/x_1 \ldots x_{n-1})$←a
The coefficients lambda (i) can be:
either uniform lambda (i)=1/k
or precomputed by the algorithm "deleted interpolation" (standard algorithm described in the cited references).

I claim:

1. An improved method for constructing a target field dependent model in the form of a decision tree for an intelligent machine, the operation of said machine is based on statistical approaches for converting input data from a source type of information into a target type of information using said decision tree, said method including:

storing in a data base a set of application field dependent files including words and symbols, thereby constituting a corpus;

performing a vocabulary selection by deriving from said corpus, a list of most frequent words and symbols;

scanning said words and symbols, and deriving therefrom a plurality of frequencies of occurrence of n-grams, which are sequences of a predefined number "n" of words and symbols, and storing said plurality of frequencies into an n-grams table;

constructing said decision tree by:

a) putting all selected vocabulary words and symbols into a first unique class C, said class initially constituting the only element of a set of classes; then, b) splitting each class of said set of classes into two subclasses $C_1$ and $C_2$, and assigning, through an iterative process, each word and symbol to one of said subclasses $C_1$ and $C_2$, based on the plurality of frequencies in said n-grams table;

c) computing for each subclass $C_1$ and $C_2$ word and symbol "x", a distance $d_1$ and a distance $d_2$ relative to each subclass $C_1$ and $C_2$, respectively, wherein said distances $d_1$ and $d_2$ are derived as follows:

$$d_1(x) = -\sum_{y=0}^{V-1} p(x,y) \, \Phi \, [p_1(y)]$$

wherein V is the number of words in the vocabulary, and $$p(x,y) = \frac{\Sigma \, c(x_1 \ldots x_{n-1} y)}{N_{total}}$$

wherein C is a counter of all n-grams among $x_1, \ldots X_{n-1}$, y and where the summation is taken over all contexts $(x_1 \ldots x_{n-1})$ such that $x_j = x$, and $N_{Total}$ is the size of the class to be partitioned, $$p_1(y) = p(y/C_1) = \frac{\Sigma \, c(x_1 \ldots x_{n-1} y)}{\Sigma \, c(x_1 \ldots x_{n-1} z)}$$

the summation in the numerator being taken over all contexts $(x_1 \ldots x_{n-1})$, where $x_j$ belongs to $C_1$; and, the summation in the denominator being taken over all contexts where $x_j$ belongs to $C_1$ and over all possible values of z from 0 to V-1, $$d_2(x) = -\sum_{y=0}^{V-1} p(x,y) \, \Phi \, [p_2(y)]$$

wherein $$p(x,y) = \frac{\Sigma \, c(x_1 \ldots x_{n-1} y)}{N_{Total}}$$

$$p_2(y) = p(y/C_2) = \frac{\Sigma \, c(x_1 \ldots x_{n-1} y)}{\Sigma \, c(x_1 \ldots x_{n-1} z)}$$

the summation in the numerator being taken over all contexts $(x_1 \ldots x_{n-1})$, where $x_j$ belongs to $C_2$; and, the summation in the denominator being taken over all contexts $(x_1 \ldots x_{n-1})$ where $x_j$ belongs to $C_2$ and over all possible values of z from 0 to V-1;

$\Phi[p] = \text{Log}_2 p$ if $p > \epsilon$ $\Phi[p] = (p/\epsilon) - 1 + \text{Log}_2(\epsilon)$ if $p < \epsilon$ with $\epsilon = [\min p(x,y)]^2$
where the minimum is taken over all non-zero values of $p(x,y)$, in which case, $\Phi[0] = 2 \, \text{Log} \, [\min p(x,y)] - 1$ d) reclassifying "x" based on the shorter distance of $d_1$ and $d_2$; and
e) testing each subclass $C_1$ and $C_2$ and deciding based on a predefined criteria, whether each class of the set of classes should be split any further; and, in case of any further split requirement, repeating said steps b) through e) thus increasing the number of elements in said set of classes.

2. The method according to claim 1 wherein said predefined criteria for further split is based on the considered class size with respect to a predefined class threshold.

3. The method according to claim 1 wherein said predefined criteria for further split is based on the total number of classes resulting from the tree construction, with respect to a predefined total number of classes.

4. The method according to claim 1 wherein said storing into the data {B} base is made amendable to enable focusing the field dependent model to the specific target field of application considered.

5. The method according to claim 1 wherein said "n" value is set to 3.

6. The method according to claim 1 wherein said "n" value is set to 5.

7. The method according to claim 1 wherein said "n" value is set to 10.

8. The method according to claim 1 further including:
constructing a binary representation of the corpus by replacing each word and symbol by its position number in said selected vocabulary;
compressing the binary representation using data compression techniques; and
scanning said binary representation of words and symbols, and deriving therefrom said plurality of frequencies of occurrence of n-grams, and storing said plurality of frequencies into said n-grams table.

9. The method according to claim 1 further including the step of modifying said selected vocabulary by an operator at a workstation to tailor said selected vocabulary to the application field.

10. In a speech recognition system to convert speech source information into a displayable target information, said speech recognition system including an acoustic processor (AP) for converting the speech signal into a string of labels, a stack decoder connected to said acoustic processor, a fast match (FM) processor connected to said stack decoder (SD), a detailed match (DM) processor connected to said stack decoder, and a language modeling (LM) device connected to said stack decoder, said language modeling device comprising:
a data base;
a language modeling processor connected to said data base;
storage means connected to said language modeling processor;
a workstation or terminal connected to said data base;
means for storing into said data base a set of application field dependent files including words and symbols, thereby constituting a corpus,
means for performing within said language modeling processor, a vocabulary selection by deriving from said corpus, a list of most frequent words and symbols;
means for scanning said words, and symbols to derive therefrom a plurality of frequencies of occurrence of n-grams, which are sequences of a predefined number "n" of words and symbols, and means for storing said plurality of frequencies into an n-grams table within said language modeling storage means;
decision tree generating means within said language modeling processor for generating, and storing into said language modeling storage means, a tree-based construction derived from said n-grams table, said tree-based construction including:
a) putting all selected vocabulary words and symbols into a first unique class C, said class initially constituting the only element of a set of classes; then,
b) splitting each class of said set of classes into two subclasses $C_1$ and $C_2$, and assigning, through an iterative process, each word and symbol to one of said classes $C_1$ and $C_2$, based on the plurality of frequencies in said n-grams table;

c) computing for each subclass $C_1$ and $C_2$ word and symbol "x", a distance $d_1$ and a distance $d_2$ relative to each subclass $C_1$ and $C_2$, respectively, wherein said distances $d_1$ and $d_2$ are derived as follows:

$$d_1(x) = - \sum_{y=0}^{V-1} p(x,y)\Phi[p_1(y)],$$

wherein V is the number of words in the vocabulary, and $$p(x,y) = \frac{\Sigma\, c(x_1 \ldots x_{n-1}y)}{N_{Total}},$$

wherein c is a counter of all n-grams among $x_1, \ldots x_{n-1}, y$ and where the summation is taken over all contexts $(x_1, \ldots x_{n-1})$ such that $x_j=x$, and $N_{Total}$ is the size of the class to be partitioned, $$p_1(y) = p(y/C_1) = \frac{\Sigma\, c(x_1 \ldots x_{n-1}y)}{\Sigma\, c(x_1 \ldots x_{n-1}z)}$$

in the numerator, the summation being taken over all contexts $(x_1 \ldots x_{n-1})$, where $x_j$ belongs to $C_1$; and, in the denominator, the summation being taken over all contexts $(x_1 \ldots x_{n-1})$ where $x_j$ belongs to $C_1$ and over all possible values of z from 0 to V-1, $$d_2(x) = - \sum_{y=0}^{V-1} p(x,y)\, \Phi\, [p_2(y)]$$

wherein $$p(x,y) = \frac{\Sigma\, c(x_1 \ldots x_{n-1}y)}{N_{Total}}$$

$$p_2(y) = p(y/C_2) = \frac{\Sigma\, c(x_1 \ldots x_{n-1}y)}{\Sigma\, c(x_1 \ldots x_{n-1}z)}$$

in the numerator, the summation being taken over all contexts $(x_1 \ldots x_{n-1})$, where $x_j$ belongs to $C_2$; and, in the denominator, the summation being taken over all contexts $(x_1 \ldots x_{n-1})$ where $x_j$ belongs to $C_2$ and over all possible values of z from 0 to V-1, $\Phi[p] = \text{Log}_2\, p$ if $p > \epsilon$ $\Phi[p] = (p/\epsilon) - 1 + \text{Log}_2(\epsilon)$ if $p < \epsilon$ with $\epsilon = [\min\, p(x,y)]^2$ d) reclassifying "x" based on the shorter distance of $d_1$ and $d_2$; and e) testing each subclass $C_1$ and $C_2$ and deciding based on a predefined criteria, whether the considered class should be split any further; and, in case of any further split requirement, repeating steps b) through e) thus increasing the number of elements in said set of classes.

11. The language modeling device of claim 10, further comprising:

means for constructing a binary representation of the corpus by replacing each word and symbol by its position number in said selected vocabulary;

means for compressing said binary representation using conventional data compression techniques;

means for scanning said binary representation of words and symbols to derive therefrom said plurality of frequencies of occurrence of n-grams; and means for storing said plurality of frequencies into said n-grams table.

12. The language modeling device of claim 10, further comprising means for modifying said selected vocabulary by an operator at said workstation to tailor said selected vocabulary to the application field.

* * * * *